(12) United States Patent
Chen et al.

(10) Patent No.: US 10,140,916 B2
(45) Date of Patent: Nov. 27, 2018

(54) CHARGE PUMP AND OPERATING METHOD THEREOF

(71) Applicant: Dazzo Technology Corporation, Taipei (TW)

(72) Inventors: Li-Chieh Chen, Taipei (TW); Hsuan-Hao Chien, Taipei (TW); Chih-Jen Hung, Taipei (TW)

(73) Assignee: DAZZO TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/886,477

(22) Filed: Feb. 1, 2018

(65) Prior Publication Data

US 2018/0226017 A1 Aug. 9, 2018

Related U.S. Application Data

(60) Provisional application No. 62/454,129, filed on Feb. 3, 2017.

(51) Int. Cl.
*H02M 3/07* (2006.01)
*G09G 3/3208* (2016.01)

(52) U.S. Cl.
CPC ............ *G09G 3/3208* (2013.01); *H02M 3/07* (2013.01)

(58) Field of Classification Search
CPC ............................. H01L 27/0222; H02M 3/07
See application file for complete search history.

(56) References Cited

U.S. PATENT DOCUMENTS

| 6,605,985 | B2* | 8/2003 | Pagliato | H02M 3/073 327/536 |
| 7,969,230 | B2* | 6/2011 | Ueda | H02M 3/073 327/536 |
| 8,508,288 | B2* | 8/2013 | MacFarlane | H02M 3/07 327/536 |

* cited by examiner

*Primary Examiner* — Hai L Nguyen
(74) *Attorney, Agent, or Firm* — Patterson + Sheridan, LLP (57) ABSTRACT

A charge pump and operating method thereof are disclosed. The charge pump includes a first capacitor to a third capacitor and a first switch to a tenth switch. The charge pump is used to receive an input voltage and provide an output voltage to a load capacitor. When the charge pump is operated in a first mode, the charge pump controls the second capacitor failure, the output voltage and the input voltage have opposite electricity and the output voltage is (−½) times the input voltage. When the charge pump is operated in a second mode, the charge pump controls the second capacitor failure, the output voltage and the input voltage have opposite electricity and the output voltage is (−⅔) times the input voltage.

18 Claims, 8 Drawing Sheets

CHARGE PUMP AND OPERATING METHOD THEREOF

CROSS-REFERENCE TO RELATED APPLICATIONS

This Application claims the benefit of U.S. Provisional Application 62/454,129 filed on Feb. 3, 2017.

BACKGROUND

Field

This disclosure relates to a display panel; in particular, to a charge pump applied to an organic light-emitting diode (OLED) display panel and an operating method thereof.

Description of the Related Art

In the conventional OLED display panel (e.g., AMOLED display panel), the charge pump is usually disposed in the source driver. The charge pump is a DC-DC converter using the capacitor to store power and used for generating the output voltage higher than the input voltage or generating negative output voltage.

Figure 1:
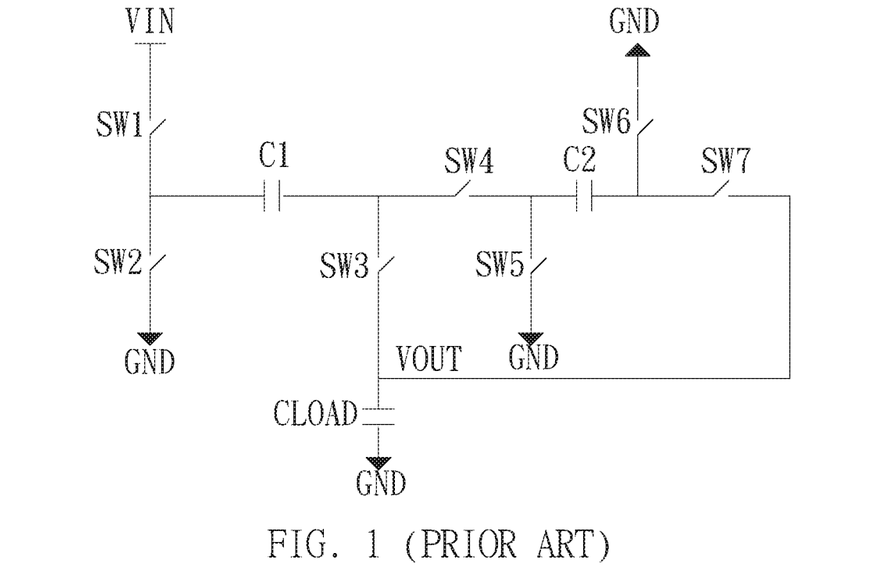
FIG. 1 illustrates a circuit schematic diagram of the conventional charge pump.

As shown in FIG. 1, the conventional charge pump can include capacitors C1~C2 and switches SW1~SW7. Although the conventional charge pump can provide the output voltage VOUT which is (−½) times the input voltage VIN to the loading capacitor CLOAD through the operations of the capacitors C1~C2 and the switches SW1~SW7, the conventional charge pump still fails to provide the output voltage VOUT which is (−⅔) times the input voltage VIN. Therefore, the conventional charge pump cannot achieve the best charge transfer and needed to be improved.

SUMMARY

Therefore, the disclosure provides a charge pump applied to an OLED display panel and an operating method thereof to overcome the above-mentioned problems in the prior art.

An embodiment of the disclosure is a charge pump. In this embodiment, the charge pump is coupled to a loading capacitor. The charge pump receives an input voltage and provides an output voltage to the loading capacitor. The charge pump includes a first capacitor, a second capacitor, a third capacitor, a first switch, a second switch, a third switch, a fourth switch, a fifth switch, a sixth switch, a seventh switch, an eighth switch, a ninth switch and a tenth switch. The first switch and the second switch are coupled in series between the input voltage and a ground terminal. One terminal of the first capacitor is coupled between the first switch and the second switch and another terminal of the first capacitor is coupled to the third switch. The third switch is coupled between the first capacitor and the fifth switch. One terminal of the second capacitor is coupled to a first node between the first capacitor and the third switch and another terminal of the second capacitor is coupled to a second node between the third switch and the fifth switch. The fourth switch is coupled between the second node and the loading capacitor. The loading capacitor is coupled between the fourth switch and the ground terminal. The fifth switch is coupled between the third switch and the third capacitor. One terminal of the sixth switch is coupled to the first node and another terminal of the sixth switch is coupled to a third node between the fifth switch and the third capacitor. The seventh switch is coupled between the third node and the ground terminal. The third capacitor is coupled between the fifth switch and the tenth switch. One terminal of the eighth switch is coupled to the ground terminal and another terminal of the eighth switch is coupled to a fourth node between the third capacitor and the tenth switch. The ninth switch is coupled between the fourth node and the first node. One terminal of the tenth switch is coupled to the fourth node and the another terminal of the tenth switch is coupled to a fifth node between the fourth switch and the loading capacitor.

In an embodiment, when the charge pump is operated in a first mode, the charge pump shuts down the second capacitor; the output voltage and the input voltage of the charge pump have opposite electricity and the output voltage is (−½) times the input voltage.

In an embodiment, when the charge pump is operated in the first mode, a first clock period of the charge pump comprises a first phase period and a second phase period in order.

In an embodiment, during the first phase period, the charge pump controls the first switch, the third switch, the fifth switch and the eighth switch conductive and controls the second switch, the fourth switch, the sixth switch, the seventh switch, the ninth switch and the tenth switch nonconductive, so that the first capacitor and the third capacitor are charged by the input voltage.

In an embodiment, during the second phase period, the charge pump controls the second switch, the third switch, the fourth switch, the seventh switch and the tenth switch conductive and controls the first switch, the fifth switch, the sixth switch, the eighth switch and the ninth switch nonconductive.

In an embodiment, when the charge pump is operated in a second mode, the output voltage and the input voltage of the charge pump have opposite electricity and the output voltage is (−⅔) times the input voltage.

In an embodiment, when the charge pump is operated in the second mode, a second clock period of the charge pump includes a first phase period, a second A phase period, the first phase period and a second B phase period in order.

In an embodiment, during the first phase period, the charge pump controls the first switch, the fifth switch and the eighth switch conductive and controls the second switch, the third switch, the fourth switch, the sixth switch, the seventh switch, the ninth switch and the tenth switch nonconductive, so that the first capacitor, the second capacitor and the third capacitor are charged by the input voltage.

In an embodiment, during the second A phase period, the charge pump controls the second switch, the fourth switch, the sixth switch and the tenth switch conductive and controls the first switch, the third switch, the fifth switch, the seventh switch, the eighth switch and the ninth switch nonconductive.

In an embodiment, during the second B phase period, the charge pump controls the second switch, the fourth switch, the seventh switch and the ninth switch conductive and controls the first switch, the third switch, the fifth switch, the sixth switch, the eighth switch and the tenth switch nonconductive.

Another embodiment of the disclosure is a charge pump operating method. In this embodiment, the charge pump operating method is used for operating a charge pump to receive an input voltage and provide an output voltage to a loading capacitor, the charge pump includes a first capacitor, a second capacitor, a third capacitor, a first switch, a second switch, a third switch, a fourth switch, a fifth switch, a sixth switch, a seventh switch, an eighth switch, a ninth switch and a tenth switch, wherein the first switch and the second switch are coupled in series between the input voltage and a ground terminal; one terminal of the first capacitor is coupled between the first switch and the second switch and another terminal of the first capacitor is coupled to the third switch; the third switch is coupled between the first capacitor and the fifth switch; one terminal of the second capacitor is coupled to a first node between the first capacitor and the third switch and another terminal of the second capacitor is coupled to a second node between the third switch and the fifth switch; the fourth switch is coupled between the second node and the loading capacitor; the loading capacitor is coupled between the fourth switch and the ground terminal; the fifth switch is coupled between the third switch and the third capacitor; one terminal of the sixth switch is coupled to the first node and another terminal of the sixth switch is coupled to a third node between the fifth switch and the third capacitor; the seventh switch is coupled between the third node and the ground terminal; the third capacitor is coupled between the fifth switch and the tenth switch; one terminal of the eighth switch is coupled to the ground terminal and another terminal of the eighth switch is coupled to a fourth node between the third capacitor and the tenth switch; the ninth switch is coupled between the fourth node and the first node; one terminal of the tenth switch is coupled to the fourth node and the another terminal of the tenth switch is coupled to a fifth node between the fourth switch and the loading capacitor. The charge pump operating method includes: (a) when the charge pump is operated in a first mode, the charge pump shuts down the second capacitor; the output voltage and the input voltage of the charge pump have opposite electricity and the output voltage is (−½) times the input voltage; and (b) when the charge pump is operated in a second mode, the output voltage and the input voltage of the charge pump have opposite electricity and the output voltage is (−⅔) times the input voltage.

Compared to the prior arts, the charge pump and operating method thereof only need ten switches and three capacitors to provide output voltage which is (−½) times of input voltage in the first mode and provide output voltage which is (−⅔) times of input voltage in the second mode. In addition, the charge pump operated in the second mode can achieve the best charge transfer through the phase switching method in the form of "ping-pong".

The advantage and spirit of the disclosure may be understood by the following detailed descriptions together with the appended drawings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

A preferred embodiment of the disclosure is a charge pump. In this embodiment, the charge pump can be applied to a source driver of an OLED display panel (e.g., AMOLED display panel) for receiving an input voltage and provides an output voltage to a loading capacitor, but not limited to this.

Figure 2:
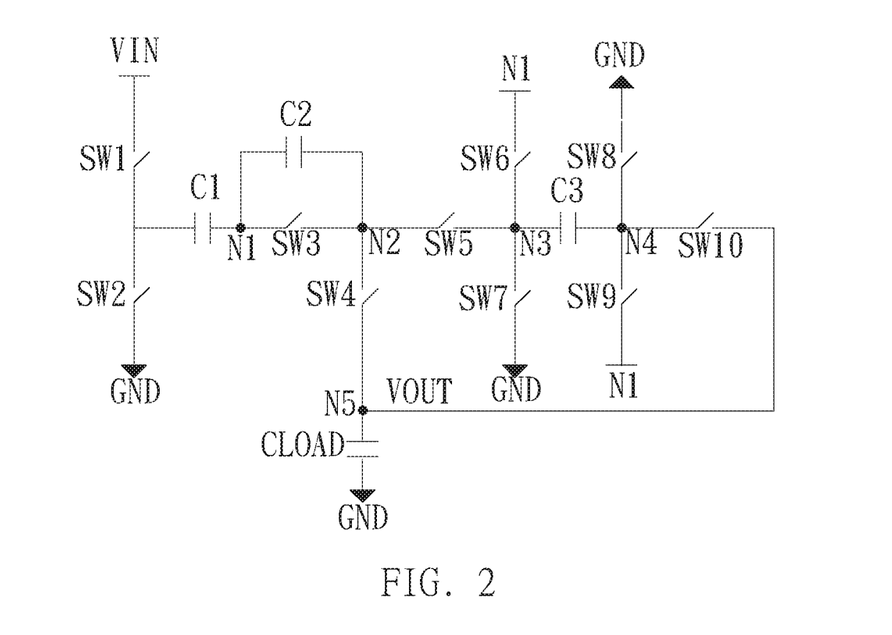
FIG. 2 illustrates a schematic diagram of the charge pump in an embodiment of the disclosure.

Please refer to FIG. 2. FIG. 2 illustrates a schematic diagram of the charge pump in this embodiment. As shown in FIG. 2, the charge pump in this embodiment, formed by ten switches and three capacitors, includes a first capacitor C1, a second capacitor C2, a third capacitor C3, a first switch SW1, a second switch SW2, a third switch SW3, a fourth switch SW4, a fifth switch SW5, a sixth switch SW6, a seventh switch SW7, an eighth switch SW8, a ninth switch SW9 and a tenth switch SW10.

The first switch SW1 and the second switch SW2 are coupled in series between the input voltage VIN and a ground terminal GNF. One terminal of the first capacitor C1 is coupled between the first switch SW1 and the second switch SW2 and another terminal of the first capacitor C1 is coupled to the third switch SW3.

The third switch SW3 is coupled between the first capacitor C1 and the fifth switch SW5. One terminal of the second capacitor C2 is coupled to a first node N1 between the first capacitor C1 and the third switch C3 and another terminal of the second capacitor C2 is coupled to a second node N2 between the third switch SW3 and the fifth switch SW5.

The fourth switch SW4 is coupled between the second node N2 and the loading capacitor CLOAD. The loading capacitor CLOAD is coupled between the fourth switch SW4 and the ground terminal GND. The fifth switch SW5 is coupled between the third switch SW3 and the third capacitor C3.

One terminal of the sixth switch SW6 is coupled to the first node N1 and another terminal of the sixth switch SW6 is coupled to a third node N3 between the fifth switch SW5 and the third capacitor C3.

The seventh switch SW7 is coupled between the third node N3 and the ground terminal GND. The third capacitor C3 is coupled between the fifth switch SW5 and the tenth switch SW10.

One terminal of the eighth switch SW8 is coupled to the ground terminal GND and another terminal of the eighth switch SW8 is coupled to a fourth node N4 between the third capacitor C3 and the tenth switch SW10. The ninth switch SW9 is coupled between the fourth node N4 and the first node N1.

One terminal of the tenth switch SW10 is coupled to the fourth node N4 and another terminal of the tenth switch SW10 is coupled to a fifth node N5 between the fourth switch SW4 and the loading capacitor CLOAD.

Figure 3:
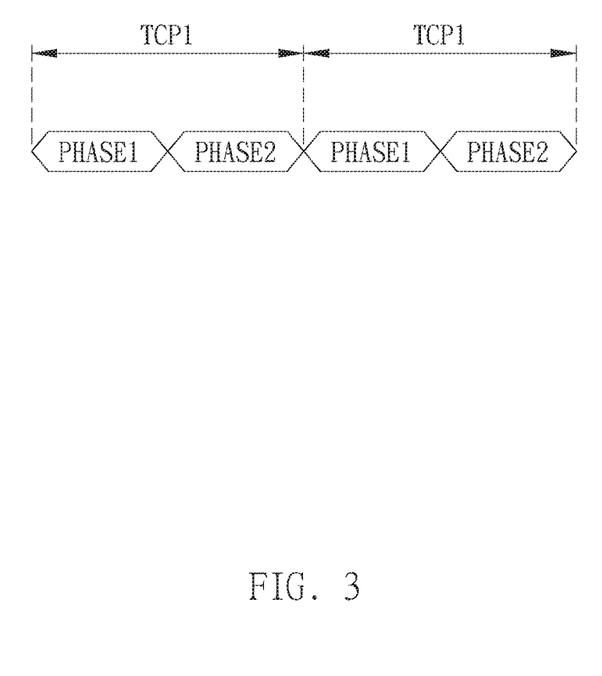
FIG. 3 illustrates a schematic diagram of the first clock period of the charge pump operated in the first mode including the first phase period and the second phase period in order.

Please refer to FIG. 3. As shown in FIG. 3, when the charge pump is operated in the first mode, a first clock period TCP1 of the charge pump includes a first phase period PHASE1 and a second phase period PHASE2 in order. In the first mode, the output voltage VOUT and the input voltage VIN of the charge pump have opposite electricity and the output voltage VOUT is (−½) times the input voltage VIN.

Figure 4A:
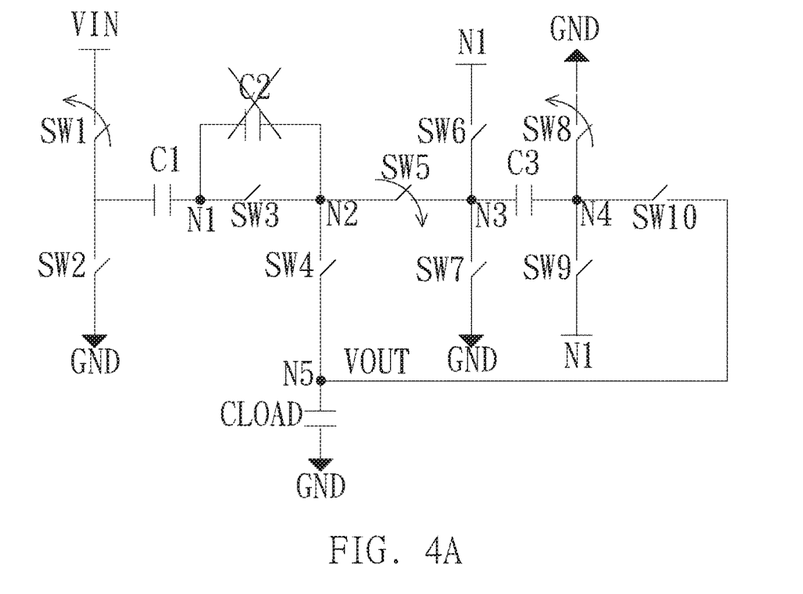
FIG. 4A and FIG. 4B illustrate circuit schematic diagrams of the charge pump operated in the first mode during the first phase period and the second phase period respectively.
Figure 4B:
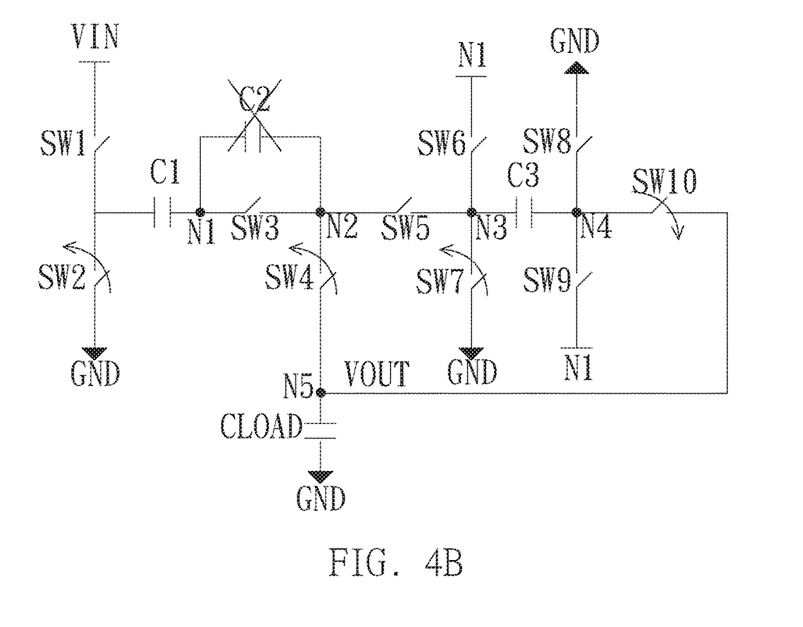

Then, please refer to FIG. 4A and FIG. 4B. FIG. 4A and FIG. 4B illustrate circuit schematic diagrams of the charge pump operated in the first mode during the first phase period PHASE1 and the second phase period PHASE2 respectively.

As shown in FIG. 4A, during the first phase period PHASE1, the charge pump controls the first switch SW1, the third switch SW3, the fifth switch SW5 and the eighth switch SW8 conductive and controls the second switch SW2, the fourth switch SW4, the sixth switch SW6, the seventh switch SW7, the ninth switch SW9 and the tenth switch SW10 nonconductive, so that the first capacitor C1 and the third capacitor C3 are charged by the input voltage VIN.

As shown in FIG. 4B, during the second phase period PHASE2, the charge pump controls the second switch SW2, the third switch SW3, the fourth switch SW4, the seventh switch SW7 and the tenth switch SW10 conductive and controls the first switch SW1, the fifth switch SW5, the sixth switch SW6, the eighth switch SW8 and the ninth switch SW9 nonconductive.

Figure 5:
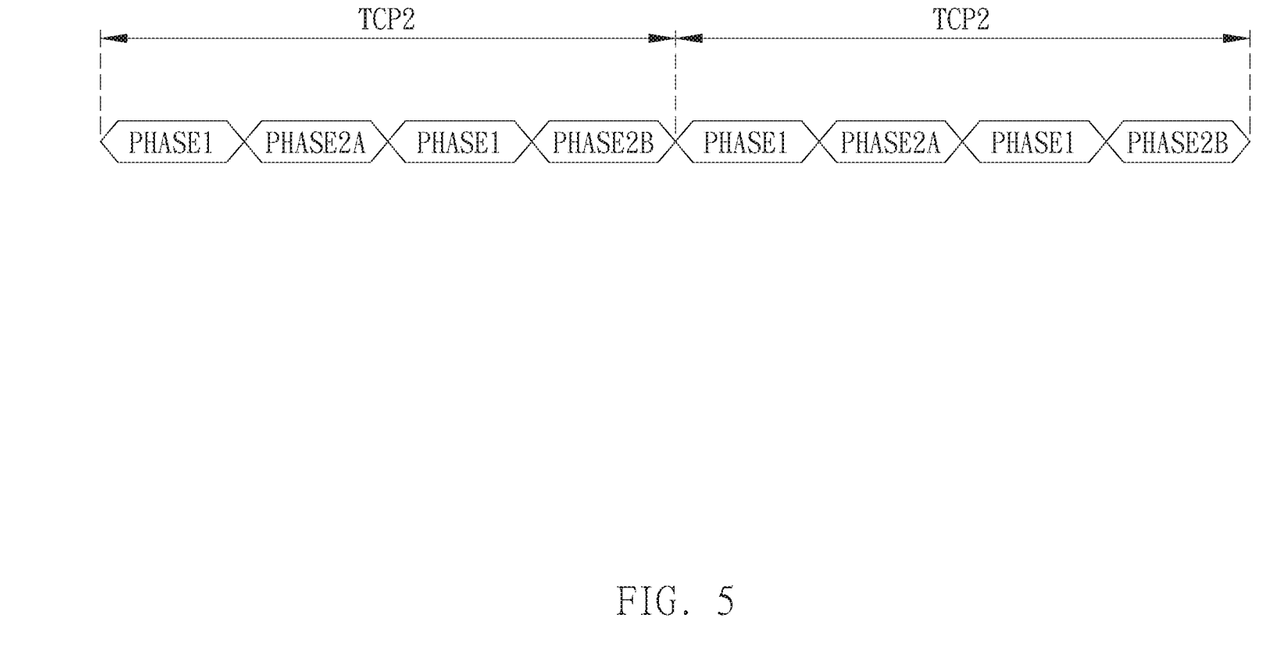
FIG. 5 illustrates a schematic diagram of the second clock period of the charge pump operated in the second mode including the first phase period, the second A phase period, the first phase period and the second B phase period in order.

Please refer to FIG. 5. As shown in FIG. 5, when the charge pump is operated in the second mode, a second clock period TCP2 of the charge pump includes a first phase period PHASE1, a second A phase period PHASE2A, the first phase period PHASE1 and a second B phase period PHASE2B in order. That is to say, the phase switching performed by the charge pump operated in the second mode has the form of "ping-pong". In the second mode, the output voltage VOUT and the input voltage VIN of the charge pump have opposite electricity and the output voltage VOUT is (−⅔) times the input voltage VIN.

Figure 6A:
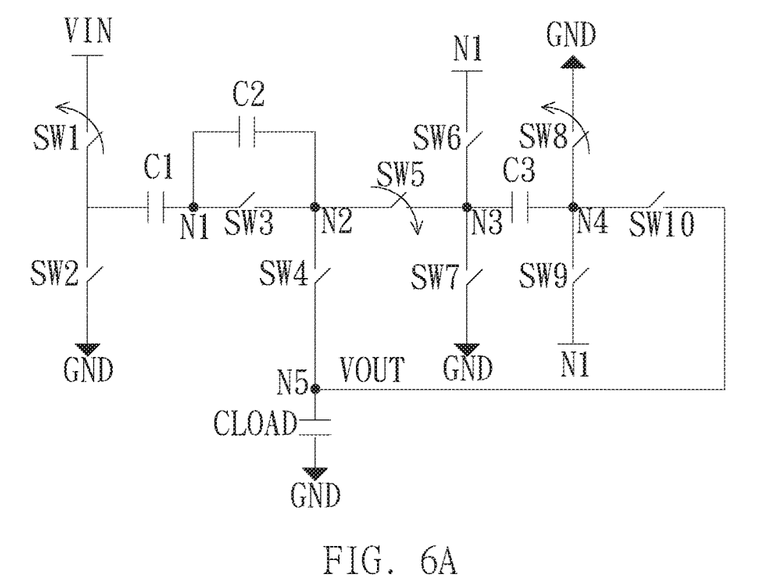
FIG. 6A, FIG. 6B and FIG. 6C illustrate circuit schematic diagrams of the charge pump operated in the second mode during the first phase period, the second A phase period and the second B phase period respectively.
Figure 6B:
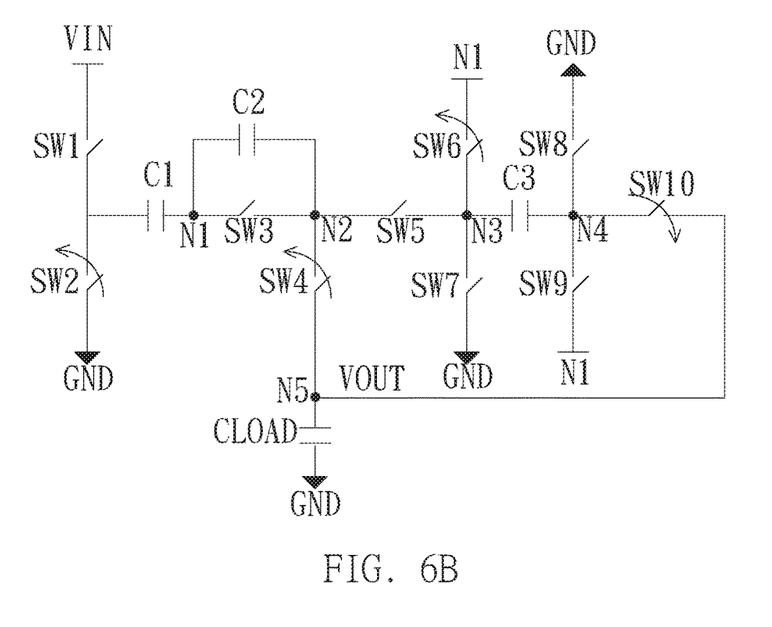
Figure 6C:
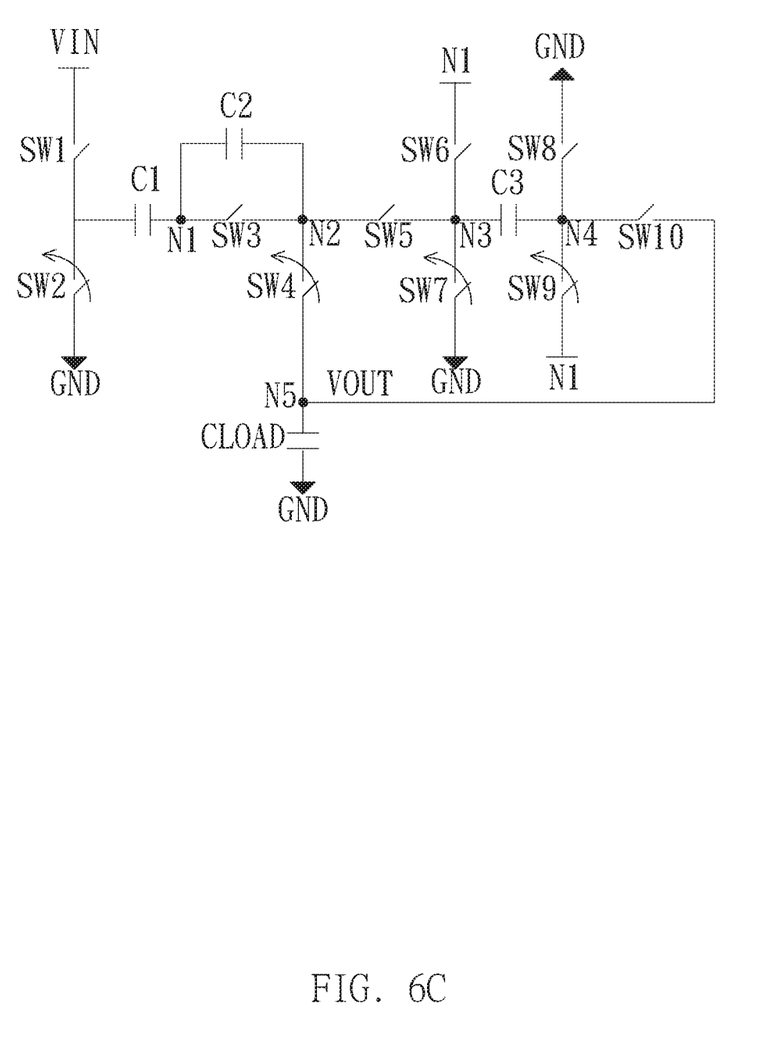

Then, please refer to FIG. 6A, FIG. 6B and FIG. 6C. FIG. 6A, FIG. 6B and FIG. 6C illustrate circuit schematic diagrams of the charge pump operated in the second mode during the first phase period PHASE1, the second A phase period PHASE2A and the second B phase period PHASE2B respectively.

As shown in FIG. 6A, during the first phase period PHASE1, the charge pump controls the first switch SW1, the fifth switch SW5 and the eighth switch SW8 conductive and controls the second switch SW2, the third switch SW3, the fourth switch SW4, the sixth switch SW6, the seventh switch SW7, the ninth switch SW9 and the tenth switch SW10 nonconductive, so that the first capacitor C1, the second capacitor C2 and the third capacitor C3 are charged by the input voltage VIN.

As shown in FIG. 6B, during the second A phase period PHASE2A, the charge pump controls the second switch SW2, the fourth switch SW4, the sixth switch SW6 and the tenth switch SW10 conductive and controls the first switch SW1, the third switch SW3, the fifth switch SW5, the seventh switch SW7, the eighth switch SW8 and the ninth switch SW9 nonconductive.

As shown in FIG. 6C, during the second B phase period PHASE2B, the charge pump controls the second switch Sw2, the fourth switch SW4, the seventh switch SW7 and the ninth switch SW9 conductive and controls the first switch SW1, the third switch SW3, the fifth switch SW5, the sixth switch SW6, the eighth switch SW8 and the tenth switch SW10 nonconductive.

Another embodiment of the disclosure is a charge pump operating method. In this embodiment, the charge pump operating method is used for operating a charge pump to receive an input voltage and provide an output voltage to a loading capacitor.

As shown in FIG. 2, the charge pump can include a first capacitor C1, a second capacitor C2, a third capacitor C3, a first switch SW1, a second switch SW2, a third switch SW3, a fourth switch SW4, a fifth switch SW5, a sixth switch SW6, a seventh switch SW7, an eighth switch SW8, a ninth switch SW9 and a tenth switch SW10.

The first switch SW1 and the second switch SW2 are coupled in series between the input voltage VIN and a ground terminal GNF. One terminal of the first capacitor C1 is coupled between the first switch SW1 and the second switch SW2 and another terminal of the first capacitor C1 is coupled to the third switch SW3. The third switch SW3 is coupled between the first capacitor C1 and the fifth switch SW5. One terminal of the second capacitor C2 is coupled to a first node N1 between the first capacitor C1 and the third switch C3 and another terminal of the second capacitor C2 is coupled to a second node N2 between the third switch SW3 and the fifth switch SW5. The fourth switch SW4 is coupled between the second node N2 and the loading capacitor CLOAD. The loading capacitor CLOAD is coupled between the fourth switch SW4 and the ground terminal GND. The fifth switch SW5 is coupled between the third switch SW3 and the third capacitor C3. One terminal of the sixth switch SW6 is coupled to the first node N1 and another terminal of the sixth switch SW6 is coupled to a third node N3 between the fifth switch SW5 and the third capacitor C3. The seventh switch SW7 is coupled between the third node N3 and the ground terminal GND. The third capacitor C3 is coupled between the fifth switch SW5 and the tenth switch SW10. One terminal of the eighth switch SW8 is coupled to the ground terminal GND and another terminal of the eighth switch SW8 is coupled to a fourth node N4 between the third capacitor C3 and the tenth switch SW10. The ninth switch SW9 is coupled between the fourth node N4 and the first node N1. One terminal of the tenth switch SW10 is coupled to the fourth node N4 and another terminal of the tenth switch SW10 is coupled to a fifth node N5 between the fourth switch SW4 and the loading capacitor CLOAD.

Figure 7:
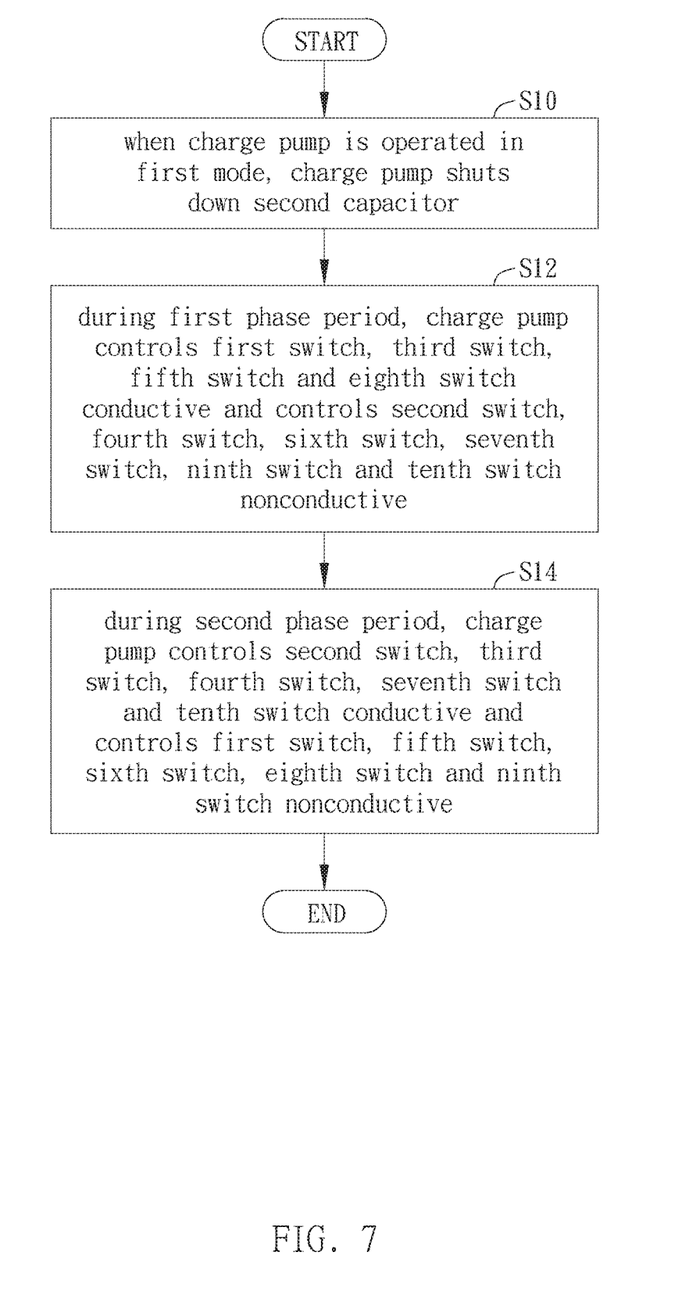
FIG. 7 and FIG. 8 illustrate flowcharts of the charge pump operating method in another embodiment of the disclosure respectively.

In this embodiment, as shown in FIG. 7, when the charge pump is operated in the first mode, the charge pump operating method includes following steps:

Step S10: when the charge pump is operated in the first mode, the charge pump shuts down the second capacitor C2; the output voltage VOUT and the input voltage VIN of the charge pump have opposite electricity and the output voltage VOUT is (−½) times the input voltage VIN. As shown in FIG. 3, when the charge pump is operated in the first mode, the first clock period TCP1 of the charge pump includes a first phase period PHASE1 and a second phase period PHASE2 in order.

Step S12: during the first phase period PHASE1, the charge pump controls the first switch SW1, the third switch SW3, the fifth switch SW5 and the eighth switch SW8 conductive and controls the second switch SW2, the fourth switch SW4, the sixth switch SW6, the seventh switch SW7, the ninth switch SW9 and the tenth switch SW10 nonconductive.

Step S14: during the second phase period PHASE2, the charge pump controls the second switch SW2, the third switch SW3, the fourth switch SW4, the seventh switch SW7 and the tenth switch SW10 conductive and controls the first switch SW1, the fifth switch SW5, the sixth switch SW6, the eighth switch SW8 and the ninth switch SW9 nonconductive.

Figure 8:
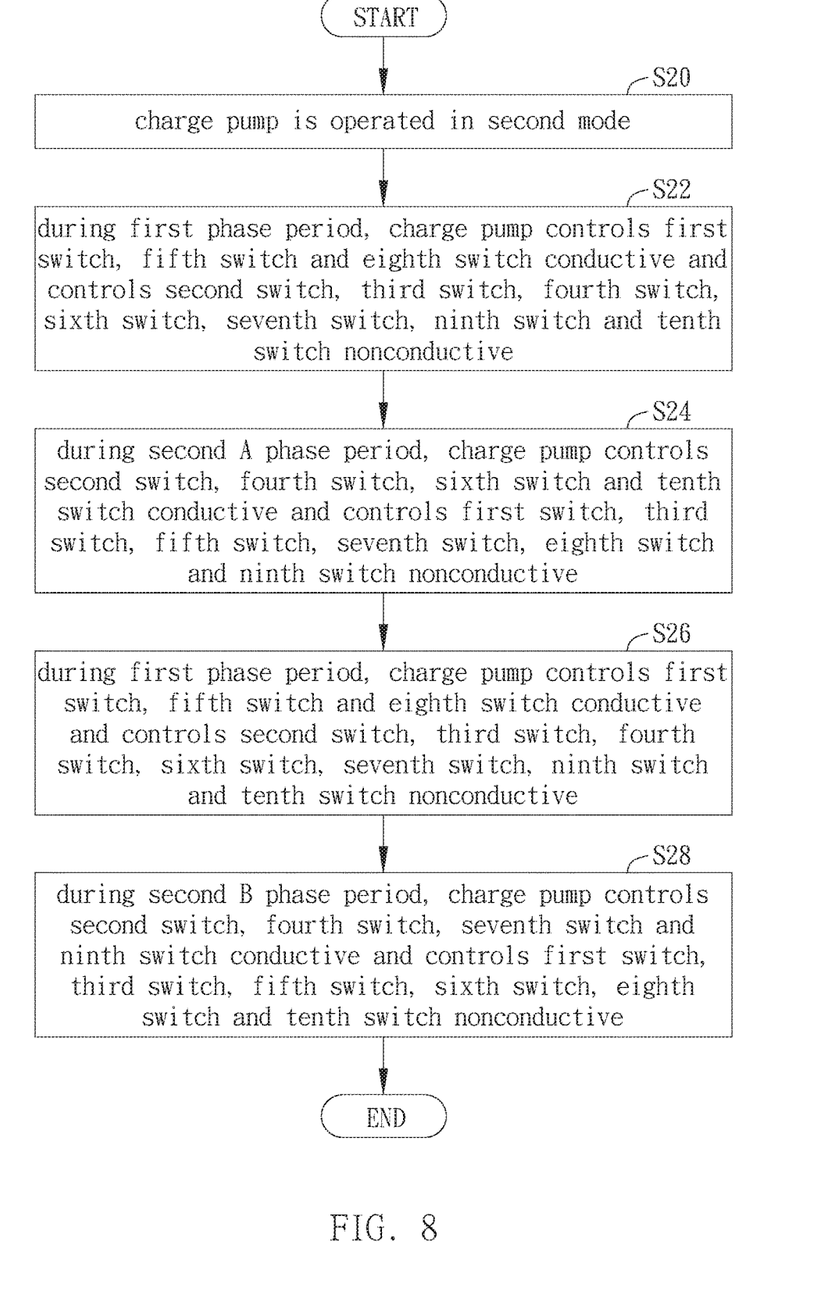

In this embodiment, as shown in FIG. 8, when the charge pump is operated in the second mode, the charge pump operating method includes following steps:

Step S20: the charge pump is operated in the second mode. At this time, the output voltage VOUT and the input voltage VIN of the charge pump have opposite electricity and the output voltage VOUT is (−⅔) times the input voltage VIN. As shown in FIG. 5, when the charge pump is operated in the second mode, a second clock period TCP2 of the charge pump includes a first phase period PHASE1, a second A phase period PHASE2A, the first phase period PHASE1 and a second B phase period PHASE2B in order. That is to say, the phase switching performed by the charge pump operated in the second mode has the form of "ping-pong".

Step S22: during the first phase period PHASE1, the charge pump controls the first switch SW1, the fifth switch SW5 and the eighth switch SW8 conductive and controls the second switch SW2, the third switch SW3, the fourth switch SW4, the sixth switch SW6, the seventh switch SW7, the ninth switch SW9 and the tenth switch SW10 nonconductive.

Step S24: during the second A phase period PHASE2A, the charge pump controls the second switch SW2, the fourth switch SW4, the sixth switch SW6 and the tenth switch SW10 conductive and controls the first switch SW1, the third switch SW3, the fifth switch SW5, the seventh switch SW7, the eighth switch SW8 and the ninth switch SW9 nonconductive.

Step S26: during the first phase period PHASE1, the charge pump controls the first switch SW1, the fifth switch SW5 and the eighth switch SW8 conductive and controls the second switch SW2, the third switch SW3, the fourth switch SW4, the sixth switch SW6, the seventh switch SW7, the ninth switch SW9 and the tenth switch SW10 nonconductive.

Step S28: during the second B phase period PHASE2B, the charge pump controls the second switch SW2, the fourth switch SW4, the seventh switch SW7 and the ninth switch SW9 conductive and controls the first switch SW1, the third switch SW3, the fifth switch SW5, the sixth switch SW6, the eighth switch SW8 and the tenth switch SW10 nonconductive.

Compared to the prior arts, the charge pump and operating method thereof only need ten switches and three capacitors to provide output voltage which is (−½) times of input voltage in the first mode and provide output voltage which is (−⅔) times of input voltage in the second mode. In addition, the charge pump operated in the second mode can achieve the best charge transfer through the phase switching method in the form of "ping-pong".

With the example and explanations above, the features and spirits of the disclosure will be hopefully well described. Those skilled in the art will readily observe that numerous modifications and alterations of the device may be made while retaining the teaching of the disclosure. Accordingly, the above disclosure should be construed as limited only by the metes and bounds of the appended claims.

What is claimed is:

1. A charge pump, coupled to a loading capacitor, receiving an input voltage and providing an output voltage to the loading capacitor, the charge pump comprising:
three capacitors comprising a first capacitor, a second capacitor and a third capacitor; and
ten switches comprising a first switch, a second switch, a third switch, a fourth switch, a fifth switch, a sixth switch, a seventh switch, an eighth switch, a ninth switch and a tenth switch;
wherein the first switch and the second switch are coupled in series between the input voltage and a ground terminal; one terminal of the first capacitor is coupled between the first switch and the second switch and another terminal of the first capacitor is coupled to the third switch; the third switch is coupled between the first capacitor and the fifth switch; one terminal of the second capacitor is coupled to a first node between the first capacitor and the third switch and another terminal of the second capacitor is coupled to a second node between the third switch and the fifth switch; the fourth switch is coupled between the second node and the loading capacitor; the loading capacitor is coupled between the fourth switch and the ground terminal; the fifth switch is coupled between the third switch and the third capacitor; one terminal of the sixth switch is coupled to the first node and another terminal of the sixth switch is coupled to a third node between the fifth switch and the third capacitor; the seventh switch is coupled between the third node and the ground terminal; the third capacitor is coupled between the fifth switch and the tenth switch; one terminal of the eighth switch is coupled to the ground terminal and another terminal of the eighth switch is coupled to a fourth node between the third capacitor and the tenth switch; the ninth switch is coupled between the fourth node and the first node; one terminal of the tenth switch is coupled to the fourth node and the another terminal of the tenth switch is coupled to a fifth node between the fourth switch and the loading capacitor.

2. The charge pump of claim 1, wherein when the charge pump is operated in a first mode, the charge pump shuts down the second capacitor; the output voltage and the input voltage of the charge pump have opposite electricity and the output voltage is (−½) times the input voltage.

3. The charge pump of claim 2, wherein when the charge pump is operated in the first mode, a first clock period of the charge pump comprises a first phase period and a second phase period in order.

4. The charge pump of claim 3, wherein during the first phase period, the charge pump controls the first switch, the third switch, the fifth switch and the eighth switch conductive and controls the second switch, the fourth switch, the sixth switch, the seventh switch, the ninth switch and the tenth switch nonconductive, so that the first capacitor and the third capacitor are charged by the input voltage.

5. The charge pump of claim 3, wherein during the second phase period, the charge pump controls the second switch, the third switch, the fourth switch, the seventh switch and the tenth switch conductive and controls the first switch, the fifth switch, the sixth switch, the eighth switch and the ninth switch nonconductive.

6. The charge pump of claim 1, wherein when the charge pump is operated in a second mode, the output voltage and the input voltage of the charge pump have opposite electricity and the output voltage is (−⅔) times the input voltage.

7. The charge pump of claim 6, wherein when the charge pump is operated in the second mode, a second clock period of the charge pump comprises a first phase period, a second A phase period, the first phase period and a second B phase period in order.

8. The charge pump of claim 7, wherein during the first phase period, the charge pump controls the first switch, the fifth switch and the eighth switch conductive and controls the second switch, the third switch, the fourth switch, the sixth switch, the seventh switch, the ninth switch and the tenth switch nonconductive, so that the first capacitor, the second capacitor and the third capacitor are charged by the input voltage.

9. The charge pump of claim 7, wherein during the second A phase period, the charge pump controls the second switch, the fourth switch, the sixth switch and the tenth switch conductive and controls the first switch, the third switch, the fifth switch, the seventh switch, the eighth switch and the ninth switch nonconductive.

10. The charge pump of claim 7, wherein during the second B phase period, the charge pump controls the second switch, the fourth switch, the seventh switch and the ninth switch conductive and controls the first switch, the third switch, the fifth switch, the sixth switch, the eighth switch and the tenth switch nonconductive.

11. A charge pump operating method, for operating a charge pump to receive an input voltage and provide an output voltage to a loading capacitor, the charge pump comprising a first capacitor, a second capacitor, a third capacitor, a first switch, a second switch, a third switch, a fourth switch, a fifth switch, a sixth switch, a seventh switch, an eighth switch, a ninth switch and a tenth switch, wherein the first switch and the second switch are coupled in series between the input voltage and a ground terminal; one terminal of the first capacitor is coupled between the first switch and the second switch and another terminal of the first capacitor is coupled to the third switch; the third switch is coupled between the first capacitor and the fifth switch; one terminal of the second capacitor is coupled to a first node between the first capacitor and the third switch and another terminal of the second capacitor is coupled to a second node between the third switch and the fifth switch; the fourth switch is coupled between the second node and the loading capacitor; the loading capacitor is coupled between the fourth switch and the ground terminal; the fifth switch is coupled between the third switch and the third capacitor; one terminal of the sixth switch is coupled to the first node and another terminal of the sixth switch is coupled to a third node between the fifth switch and the third capacitor; the seventh switch is coupled between the third node and the ground terminal; the third capacitor is coupled between the fifth switch and the tenth switch; one terminal of the eighth switch is coupled to the ground terminal and another terminal of the eighth switch is coupled to a fourth node between the third capacitor and the tenth switch; the ninth switch is coupled between the fourth node and the first node; one terminal of the tenth switch is coupled to the fourth node and the another terminal of the tenth switch is coupled to a fifth node between the fourth switch and the loading capacitor, the charge pump operating method comprises:

(a) when the charge pump is operated in a first mode, the charge pump shuts down the second capacitor; the output voltage and the input voltage of the charge pump have opposite electricity and the output voltage is (−½) times the input voltage; and (b) when the charge pump is operated in a second mode, the output voltage and the input voltage of the charge pump have opposite electricity and the output voltage is (−⅔) times the input voltage.

12. The charge pump operating method of claim 11, wherein when the charge pump is operated in the first mode, a first clock period of the charge pump comprises a first phase period and a second phase period in order.

13. The charge pump operating method of claim 12, wherein during the first phase period, the charge pump controls the first switch, the third switch, the fifth switch and the eighth switch conductive and controls the second switch, the fourth switch, the sixth switch, the seventh switch, the ninth switch and the tenth switch nonconductive, so that the first capacitor and the third capacitor are charged by the input voltage.

14. The charge pump operating method of claim 12, wherein during the second phase period, the charge pump controls the second switch, the third switch, the fourth switch, the seventh switch and the tenth switch conductive and controls the first switch, the fifth switch, the sixth switch, the eighth switch and the ninth switch nonconductive.

15. The charge pump operating method of claim 11, wherein when the charge pump is operated in the second mode, a second clock period of the charge pump comprises a first phase period, a second A phase period, the first phase period and a second B phase period in order.

16. The charge pump operating method of claim 15, wherein during the first phase period, the charge pump controls the first switch, the fifth switch and the eighth switch conductive and controls the second switch, the third switch, the fourth switch, the sixth switch, the seventh switch, the ninth switch and the tenth switch nonconductive, so that the first capacitor, the second capacitor and the third capacitor are charged by the input voltage.

17. The charge pump operating method of claim 15, wherein during the second A phase period, the charge pump controls the second switch, the fourth switch, the sixth switch and the tenth switch conductive and controls the first switch, the third switch, the fifth switch, the seventh switch, the eighth switch and the ninth switch nonconductive.

18. The charge pump operating method of claim 15, wherein during the second B phase period, the charge pump controls the second switch, the fourth switch, the seventh switch and the ninth switch conductive and controls the first switch, the third switch, the fifth switch, the sixth switch, the eighth switch and the tenth switch nonconductive.

* * * * *